(No Model.)
D. J. BYRNE.
CARBURETER.
No. 590,640. Patented Sept. 28, 1897.
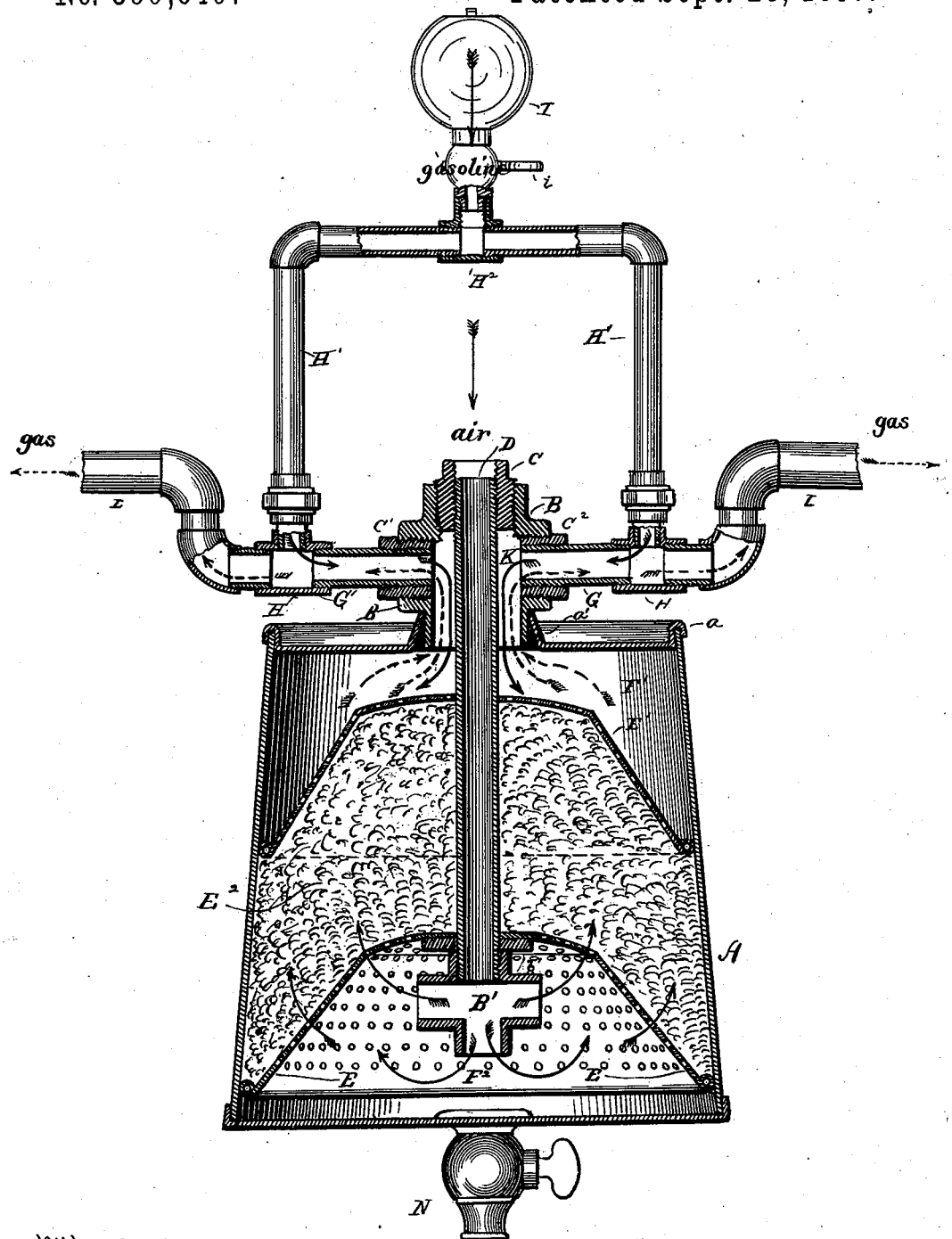
Witnesses:
Otis D. Swett
G. B. Fowle
Inventor.
Daniel J. Byrne,
By Thomas P. Simpson,
Attorney

UNITED STATES PATENT OFFICE.

DANIEL J. BYRNE, OF WASHINGTON, DISTRICT OF COLUMBIA.

CARBURETER.

SPECIFICATION forming part of Letters Patent No. 590,640, dated September 28, 1897.

Application filed January 2, 1897. Serial No. 617,745. (No model.)

*To all whom it may concern:*

Be it known that I, DANIEL J. BYRNE, a citizen of the United States, residing at Washington city, in the District of Columbia, have invented certain new and useful Improvements in Carbureters; and I do declare the following to be a full, clear, and exact description of the invention, such as will enable others skilled in the art to which it appertains to make and use the same, reference being had to the accompanying drawing, and to the letters of reference marked thereon, which forms a part of this specification.

The special object of the invention is to make an apparatus by which air or gas may be cheaply and conveniently carbureted for illuminating purposes, so that private persons and families may at little expense make their own gas as they wish to use it.

The drawing is a vertical diametrical section of the carbureter with its inlet and outlet pipes partly in section or broken away.

In the drawing, A represents the hydrocarbon-chamber, with the air-tight cover $a$ and upwardly-tapering neck $a'$. In the latter is centrally located the four-way tube B, in which screws a bushing C, internally threaded to receive the vertically-pendent and open-ended tube D. The lower end of tube D screws into a four-way tube B', on which rests the washer $b'$, while upon this washer is supported the reticulated plate or diaphragm E. Parallel to the latter is arranged a similar diaphragm E', both upwardly convexed, while between them is arranged the absorbent $E^2$, which is more or less compressed. Through the middle of the diaphragms and absorbent passes the air-tube D, and over the upper diaphragm is the gas-chamber F', and under the lower one the air-chamber $F^2$.

The four-way tube B is provided with the three bushings C C' $C^2$ for the air-tube D and the pipes G G', the latter being jointed by the three-way tubes H to the U-pipe H', which is connected at its middle by a three-way tube $H^2$ with the superposed hydrocarbon-tank I. From this tank, preferably filled with gasolene and provided with a cock $i$ to regulate the flow of the liquid, the hydrocarbon is carried by gravity through the U-tube H' and falls upon the greatest convexity of the diaphragm E', over which it spreads and finds its way through the diaphragm-perforations to the absorbent. The air is injected by any suitable compressor into and through the tube D to the chamber $F^2$, in which it is dispersed and passes up through the absorbent and diaphragms to the gas-chamber F'. From this receptacle the gas or carbureted air passes up through the annular channel K to the outlet-pipes L.

N are stop-cocks, arranged, respectively, to regulate the flow of gasolene from the tank and to remove the drippings thereof in the chamber $F^2$.

Of course I am aware that it is very old to carburet air or gas by passing them through an absorbent saturated with hydrocarbon; but

What I claim as new, and desire to protect by Letters Patent, is—

An air-carbureter having the cover $a$ with tapering neck $a'$, a four-way tube fitting in said neck, bushings in said four-way tube, air-tube D, the pipes G G' and the pipe H' jointed by three-way tubes to the pipes G G' and the tank I, all combined and arranged as shown and for the purpose set forth.

In testimony whereof I affix my signature in presence of two witnesses.

DANIEL J. BYRNE.

Witnesses:
   THOMAS A. CRUIKSHANK,
   HENRY K. WHITE.